P. BASTIAN.
STOP FOR PHONOGRAPHS.
APPLICATION FILED MAY 10, 1907.

916,973.

Patented Apr. 6, 1909.

Witnesses:

Inventor:
P. Bastian

UNITED STATES PATENT OFFICE.

PAUL BASTIAN, OF STUTTGART, GERMANY, ASSIGNOR TO WILHELM RECLAM, OF STUTTGART, GERMANY.

STOP FOR PHONOGRAPHS.

No. 916,973.  Specification of Letters Patent.  Patented April 6, 1909.

Application filed May 10, 1907. Serial No. 372,900.

*To all whom it may concern:*

Be it known that I, PAUL BASTIAN, a subject of the German Emperor, residing at Stuttgart, Würtemburg, in the Empire of Germany, have invented a new and useful Improvement in Stops for Phonographs, of which the following is a specification.

The object of the invention is to provide a reliable stop for automatically arresting the rotation of the phonograph cylinder at the end of each tune and thus prevent over-running or damage to the reproducing mechanism thereof.

The annexed drawings illustrate the invention as applied to a phonograph of which are shown only the parts immediately connected with the automatic stop-mechanism, viz: a portion of the record cylinder, mandrel, operating screw shaft and pulley and a portion of the arm on the screw shaft for working the sound box.

Figure 1:
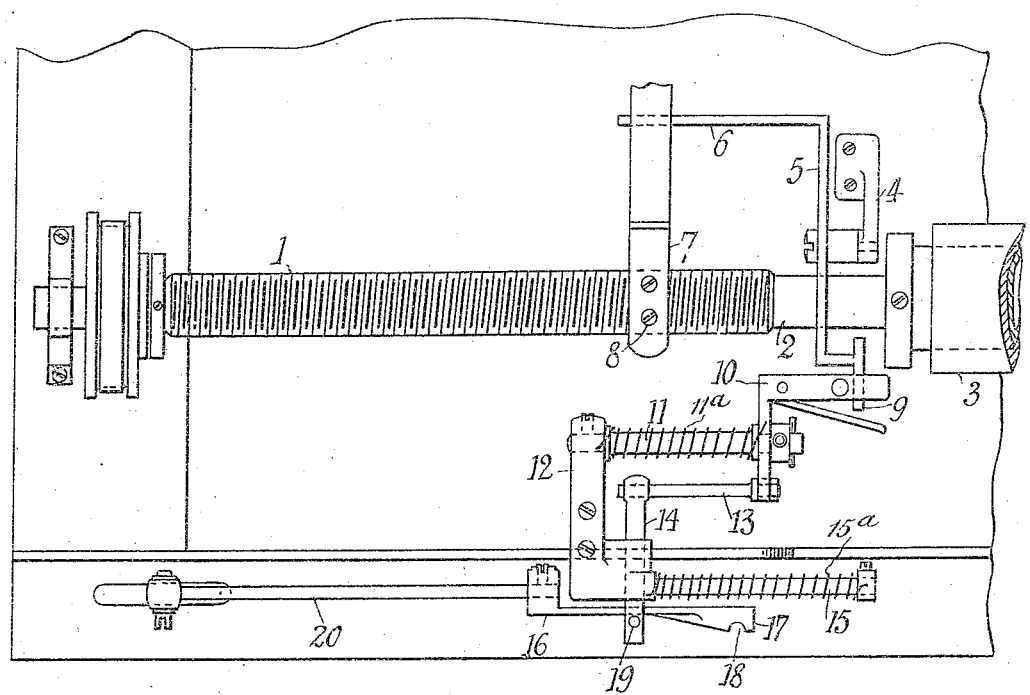
Figure 2:
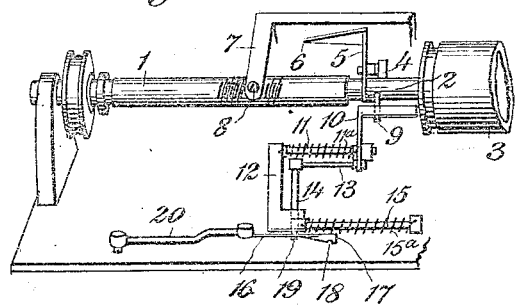

Figure 1 is a plan; and Fig. 2 is a perspective view of the parts mentioned.

The ordinary operating screw shaft 1 carries on its plain portion 2 the mandrel and cylinder 3 near which is fixed on the phonograph box a bracket 4 carrying a pivoted lever 5 with a tapered crank arm 6 against which the arm 7 of the sound box moves toward the end of the record and while traveling along such tapered crank-arm 6, it causes the lever 5 to turn on its pivot. The screws 8 are those ordinarily used for securing the usual feed nut to arm 7. The lever 5 has a further crank arm 9 in engagement with a rocking lever 10 pivotally mounted on the pin 11 furnished with a torsion spring 11$^a$ adapted to keep the lever in contact with the arm 9. The pin 11 is rigidly connected to an angular block 12. The rocking lever 10 has a fixed stem 13 loosely engaged with the stop- or lock-bar 14 fixed to the inner end of a round bar 15 mounted in a bearing in the block 12. The bar 15 is under control of a torsion spring 15$^a$. The outer end of the lock-bar 14 carries a pin 19 which normally bears against a co-acting spring-arm 16 formed with a wedge-shaped end 17 and groove 18 and whose socket end is firmly fixed to the brake bar 20 of the phonograph mechanism.

By pushing the brake rod 20 toward the adjacent end of the box, the groove 18 of the spring-arm 16 will engage with the pin 19 and be held thereby while the arm 7 of the sound box travels in the direction of the record cylinder. When the arm 7 reaches the end of its operative travel and moves longitudinally along the tapered edge of the arm 6 of the lever 5, it causes the latter to swivel. In this manner the arm 9 rocks the lever 10 which in turn and by its stem 13 operates the lock-bar 14 so as to lift the pin 19 thereof away from the groove 18 of its co-acting spring-arm 16. Immediately the latter becomes free, it will be pulled away with the brake rod 20 by the action of the usual tension spring, not shown, and thus enables the ordinary brake to arrest the rotation of the record cylinder.

I claim:

In automatic stop-mechanism for phonographs, the combination with the screw-operated traveling arm, of a two-armed pivoted and tapered lever, a spring-controlled rocking lever in combination with said lever, a lock-bar connected with said rocking lever and a co-acting grooved spring-arm for said lock-bar, and a phonograph brake-rod fast on the end of said spring-bar, as set forth.

PAUL BASTIAN.

Witnesses:
ADALBERT BAUER,
ERNST ENTENMANN.